United States Patent Office 3,308,117
Patented Mar. 7, 1967

3,308,117
AMINOACYL CYTOSAMINE DERIVATIVES AND PROCESS
Ronald B. Kelly, Cooper Township, Kalamazoo County, and Harold E. Renis, Portage, Mich., assignors to The Upjohn Company, Kalamazoo, Mich., a corporation of Delaware
No Drawing. Filed Sept. 21, 1964, Ser. No. 398,108
6 Claims. (Cl. 260—211.5)

This invention relates to new antivirally and antibacterially active compounds and is more particularly concerned with aminoacyl cytosamine derivatives (III) and a process for the production thereof.

This application is a continuation-in-part of application Serial No. 390,735, filed August 19, 1964, now abandoned.

The novel compounds and the process for the production thereof can be illustratively represented by the following formulae:

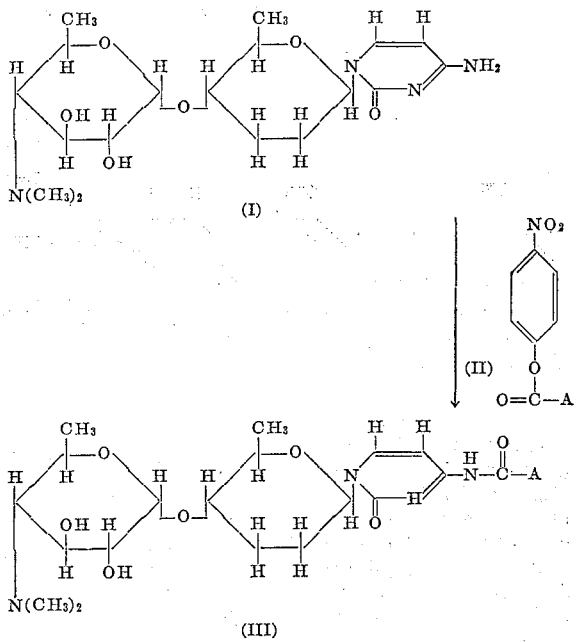

wherein A is selected from the group consisting of the radical

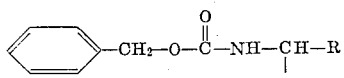

in which R is selected from the group consisting of hydrogen, alkyl and aralkyl, having from 1 to 8 carbon atoms, inclusive, and the radical

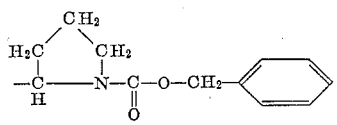

The process of the present invention comprises: refluxing cytosamine (I) with a selected p-nitrophenyl ester (II) in an organic solvent to give the corresponding $N_4$-(N-carbobenzoxyaminoacyl) cytosamine (III).

The novel aminoacyl cytosamine derivatives of the structural Formula III are generally active against virus such as Coxsackie A-21 (Coe), Hemadsorption Type I (HA-1), herpes, e.g., herpes simplex, tobacco mosaic virus and the like. In tissue cultures the activity of these compounds is such that from 5 to 25 p.p.m. of the cytosamine derivatives in water solution will eliminate the growth of virus. Thus, the compounds of structure III can be used for the maintenance of virus-free tissue culture wherever required in research studies. The compounds can furthermore be used as a spray on virus-infected plants, such as tobacco plants infected with tobacco mosaic virus.

The compounds of the structural Formula III are also useful against bacteria such as Lactobacillus, particularly *Lactobacillus casei, Sarcina lutea,* and *Mycobacterium avium.* The antibacterial activity is useful for cleansing instruments used in bacteriology, equipment, apparatus used in industry where fermentation easily takes place, such as equipment in the processing of orange juice and other fruit juices, and in the production of cheeses. From 5 to 100 p.p.m. of the product of structural Formula III in aqueous solution is useful to keep such equipment sterile. The compounds, moreover, can be used in drinking water for poultry, particularly chickens and pigeons, to prevent tuberculosis as produced by *Mycobacterium avium.*

The compounds of Formula III moreover have been found to be cytotoxic against KB cells and thus can be used for cleansing instruments applied in the surgical removal of cancer and tumor tissues.

In carrying out the process of the present invention, cytosamine (I) is reacted with the p-nitrophenylester of the selected amino acid of the Formula II. In the preferred embodiment of this invention, the cytosamine and the p-nitrophenylester are used in approximately equal molecular quantities at the start of the reaction, in a solvent such as ethylene dichloride, chloroform, and the like, to which may be added an alcohol such as ethanol, to increase the solubility of the reactants. During the reaction additional amounts of the p-nitrophenylester (5–50% of the original amount) are added from 1 to 3 times to increase the final yield. This addition, however, is not necessary. The reaction is, moreover, carried out at the reflux temperature of the mixture and requires a time between 6 hours and 4 days. Although the reaction can be carried out at lower temperatures, the reaction time will be significantly increased. After the reaction is completed, which can be ascertained by taking ultraviolet absorption spectra to show absence of cytosamine, the product is obtained by evaporating the reaction mixture and chromatographing the residue. Chloroform, ethylene dichloride, methanol, ethanol, benzene and the like can be used in the chromatographic isolation of the desired aminoacyl derivative of cytosamine. The obtained product can be furthermore purified by additional chromatography and/or recrystallization procedures, as well as other methods such as countercurrent distribution.

The following examples are illustrative of the process and products of the present invention but are not to be construed as limiting.

Example 1.—$N_4$-(N-carbobenzoxyglycyl) cytosamine (IV)

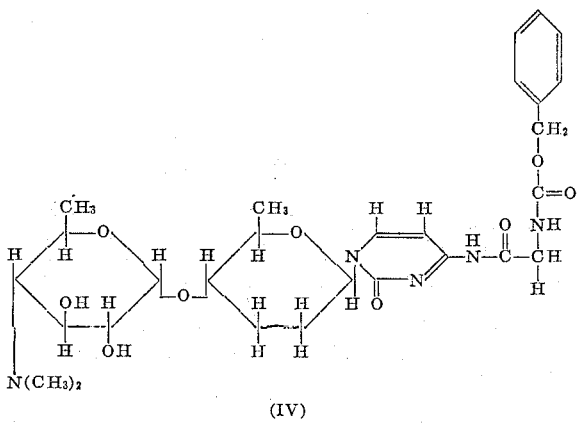

(IV)

A mixture of 398 mg. (1 mmole) of cytosamine, 330 mg. (1 mmole) of N-carbobenzoxyglycine p-nitrophenyl-ester and 100 ml. of ethylene dichloride was refluxed for 48 hours. Thirty-three milligrams of additional N-carbobenzoxyglycine p-nitrophenylester was added after 6 hours and again after 24 hours. After a total reflux time of 48 hours, the ultraviolet absorption spectrum indicated absence of cytosamine. The reaction solution was evaporated in vacuo and the residue was chromatographed over 16 g. of silica gel in a column of 19 mm. diameter. The residue was dissolved in 25 ml. of chloroform, poured over the column, and the column eluted with 10-ml. fractions with the following solvent mixtures:

Fractions 1–19: Chloroform 90 parts, ethanol 10 parts.
Fractions 19–70: Chloroform 70 parts, ethanol 27 parts, water 3 parts.

Fractions 25–32 were combined and evaporated in vacuo. The residue, 145 mg., was triturated with ether and the resulting solid, 99 mg., was collected and dried. This material was $N_4$-(N-carbobenzoxyglycyl)cytosamine having $\lambda_{max.}^{EtOH}$ 247 millimicrons and the following analysis:

Analysis.—Calcd. for $C_{28}H_{39}N_5O_9$: C, 57.03; H, 6.67; N, 11.88. Found: C, 57.13; H, 6.91; N, 11.62.

Example 2.—$N_4$-(carbobenzoxy-L-alanyl) cytosamine (V)

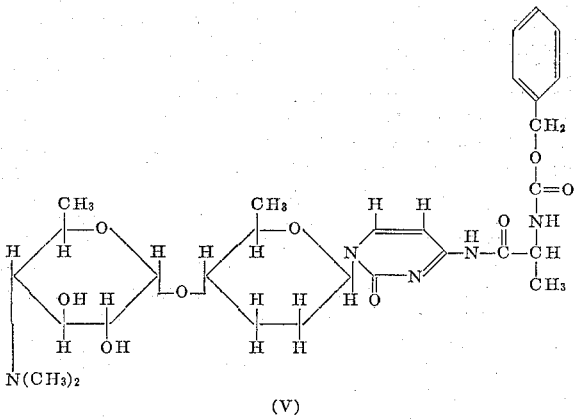

(V)

A mixture of 2 g. (5 mmoles) of cytosamine, 1.72 g. (5 mmoles) of N-carbobenzoxy-L-alanine p-nitrophenyl-ester and 500 ml. of ethylene dichloride was refluxed for 30 hours. During this period two portions of 172 mg. (1 mmole) of N-carbobenzoxy-L-alanine p-nitrophenylester were added, one after 6 hours, the other after 24 hours. The ultraviolet spectrum of the acid-soluble material in the reaction mixture indicated the termination of the reaction. When this point had been reached, the mixture was evaporated in vacuo, the residue was chromatographed over 250 g. of silica gel contained in a column of 3.8 cm. diameter. The residue was applied to the column in 40 ml. of ethylene dichloride and the column was eluted with 25-ml. fractions of the following solvent mixtures:

Fractions 1–114: ethylene dichloride 90 parts, ethanol 10 parts.
Fractions 119–150: ethylene dichloride, 70 parts, ethanol 30 parts.

Fractions 26–40 were combined and evaporated in vacuo to give 1.44 g. of $N_4$-(N-carbobenzoxy-L-alanyl) cytosamine. Twenty milligrams of this material was dissolved in methanol and reprecipitated by addition of ether to give $N_4$-(N-carbobenzoxy-L-alanyl) cytosamine having $\lambda_{max.}^{EtOH}$ 246 millimicrons and the following analysis:

Analysis.—Calcd. for $C_{29}H_{41}N_5O_9$: C, 57.70; H, 6.85; N, 11.60. Found: C, 57.44; H, 7.00; N, 11.48.

Example 3.—$N_4$-(N-carbobenzoxy-L-valyl) cytosamine (VI)

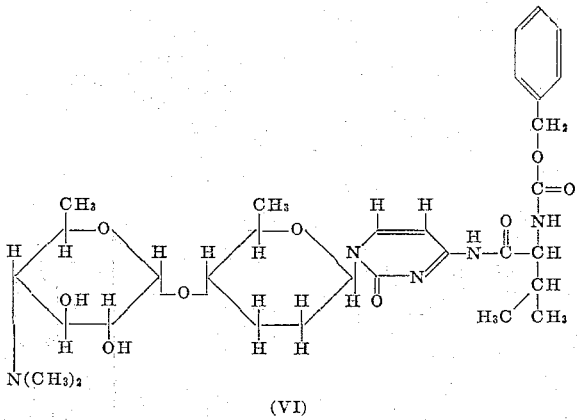

(VI)

A mixture of 3.98 g. (10 mmoles) of cytosamine, 3.72 g. (10 mmoles) of N-carbobenzoxy-L-valine p-nitrophenylester and 1000 ml. of ethylene dichloride containing 10 ml. of ethanol was refluxed for a period of 48 hours. After 24 hours and also after 30 hours, 370 mg. (1 mmole) of N-carbobenzoxy-L-valine p-nitrophenylester was added. After an ultraviolet spectrum of the acid soluble material indicated absence of cytosamine, the reaction mixture was evaporated in vacuo, and the resulting residue was chromatographed over 400 g. of silica gel. The column was eluted with the following solvent fractions (25 ml. each):

Fractions 1–85: benzene 95 parts, methanol 5 parts.
Fractions 85–180: benzene 90 parts, methanol 10 parts.

Fractions 118–135 were combined and evaporated in vacuo to give 5.50 g. of $N_4$-(N-carbobenzoxy-L-valyl) cytosamine. A portion of 1 g. of this material was dissolved in benzene and precipitated by adding ether. The precipitated pure $N_4$-(N-carbobenzoxy-L-valyl) cytosamine had $\lambda_{max.}^{EtOH}$ 245 millimicrons and an analysis as follows:

Analysis.—Calcd. for $C_{31}H_{45}N_5O_9$: C, 58.94; H, 7.18; N, 11.09. Found: C, 58.67; H, 7.30; N, 11.27.

*Example 4.—$N_4$-(N-carbobenzoxy-L-phenylalanyl) cytosamine (VII)*

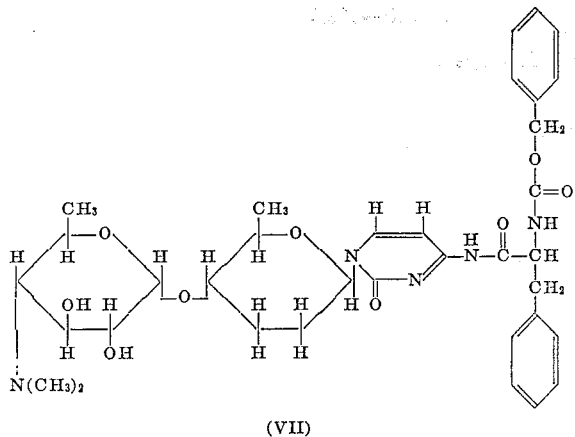

(VII)

A mixture of cytosamine (3.98 g., 10 mmoles), N-carbobenzoxy-L-phenylalanine p-nitrophenylester (4.20 g., 10 mmoles), 1000 ml. of ethylene dichloride and 10 ml. of absolute ethanol was refluxed for a period of 6 hours. Thereafter was added 840 mg. (2 mmoles) of N-carbobenzoxy-L-phenylalanine p-nitrophenylester and reflux was continued for another 18 hours. A one-milliliter sample was taken from the reaction mixture, diluted with 5 ml. of chloroform and the solution extracted with 5 ml. of 1 N hydrochloric acid. The acidic, aqueous solution was washed with 5 ml. of chloroform. One milliliter of the remaining solution was diluted to 10 ml. with absolute ethanol. The ultraviolet spectrum of this diluted solution indicated absence of cytosamine; the reaction solution was therefore evaporated in vacuo and the residue washed by refluxing with 500 ml. of ether. The solution was decanted and the residue (6.30 g.) was chromatographed over 200 g. of silica gel, contained in a column of 3.8 cm. diameter. The crude material was applied to the column, dissolved in 20 ml. of benzene, and fractions were taken of 25 ml. each with the following solvent compositions:

Fractions 1–10: benzene 99 parts, methanol 1 part.
Fractions 11–52: benzene 95 parts, methanol 5 parts.
Fractions 53–117: benzene 90 parts, methanol 10 parts.

Fractions 72–88, representing a peak of material, were combined and evaporated in vacuo. The residue, 1.90 g., was dissolved in methanol and ether was added to cause precipitation. The precipitate, (1.25 g.), was $N_4$-(N-carbobenzoxy-L-phenylalanyl) cytosamine having $\lambda_{max.}^{EtOH}$ 250 millimicrons and an analysis as follows:
*Analysis.*—Calcd. for $C_{35}H_{45}N_5O_9$: C, 61.84; H, 6.67; N, 10.30. Found: C, 61.57; H, 7.20; N, 10.78.

*Example 5.—$N_4$-(carbobenzoxy-L-prolyl) cytosamine (VIII)*

In the manner given in Example 4, a mixture of cytosamine, N-carbobenzoxy-L-proline p-nitrophenylester was refluxed for a period of 30 hours to give $N_4$-(N-carbobenzoxy-L-prolyl) cytosamine. The crude product was chromatographed over 250 g. of silica gel with fractions of 20 ml. taken. The solvent used for elution consisted of ethylene dichloride 70 parts and ethanol 30 parts. Fractions 27–40 were combined, evaporated in vacuo, and the material redissolved in benzene and precipitated by the addition of ether. The precipitated material consisted of $N_4$-(N-carbobenzoxy-L-proline) cytosamine had $\lambda_{max.}^{EtOH}$ 241 millimicrons and the following analysis:
*Analysis.*—Calcd. for $C_{31}H_{43}N_5O_9$: N, 11.12. Found: N, 11.33.

In the manner given in Example 1, other $N_4$-(N-carbobenzoxyaminoacyl) cytosamines can be prepared by refluxing cytosamine in a suitable organic solvent with selected N-carbobenzoxy-amino acid p-nitrophenylester for periods of 6–48 hours. Representative $N_4$-(N-carbobenzoxy-L-aminoacyl) cytosamine thus prepared, include: $N_4$-(N-carbobenzoxy-L-norvalyl) cytosamine; $N_4$-(N-carbobenzoxy-L-leucyl) cytosamine; $N_4$-(N-carbobenzoxy-L-isoleucyl) cytosamine; $N_4$-(N-carbobenzoxy-L-norleucyl) cytosamine; $N_4$-(N-carbobenzoxy-L-isovalyl) cytosamine; $N_4$-(N-carbobenzoxy-L-α-aminobutyryl) cytosamine; $N_4$-(N-carbobenzoxy-L-α-aminoheptanoyl) cytosamine; $N_4$-(N-carbobenzoxy-L-α-aminooctanoyl) cytosamine; $N_4$-(N-carbobenzoxy-L-phenylglycyl) cytosamine, and the like.

We claim:
1. An aminoacyl derivative of the formula:

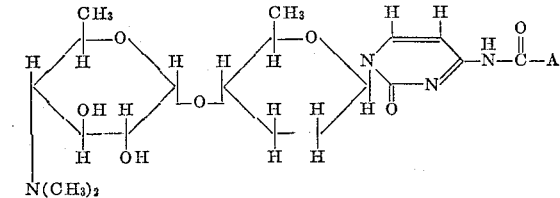

wherein A is selected from the group consisting of the radical

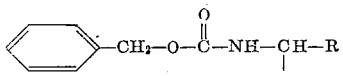

in which R is selected from the group consisting of hydrogen, alkyl and aralkyl, having from 1 to 8 carbon atoms, inclusive, and the radical

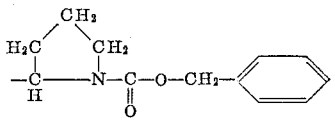

2. $N_4$-(N-carbobenzoxyglycyl) cytosamine.
3. $N_4$-(N-carbobenzoxy-L-alanyl) cytosamine.
4. $N_4$-(N-carbobenzoxy-L-valyl) cytosamine.
5. $N_4$-(N-carbobenzoxy-L-phenylalanyl) cytosamine.
6. $N_4$-(N-carbobenzoxy-L-prolyl) cytosamine.

(References on following page)

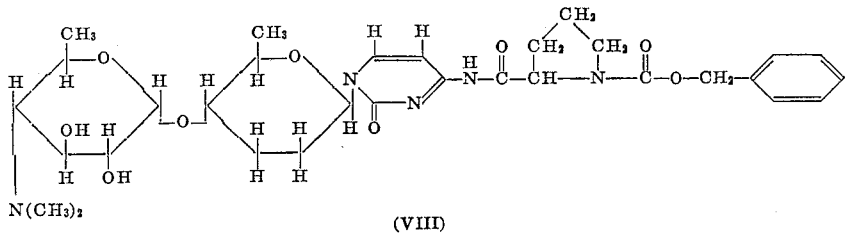

(VIII)

References Cited by the Examiner

UNITED STATES PATENTS 3,035,041  5/1962  Schwyer et al. _____ 260—112.5

ELBERT L. ROBERTS, *Primary Examiner.*
LEWIS GOTTS, *Examiner.*
J. R. BROWN, *Assistant Examiner.*